US012276355B2

(12) United States Patent
Jilderos (10) Patent No.: US 12,276,355 B2
(45) Date of Patent: Apr. 15, 2025

(54) VALVE FOR ADJUSTING A FLUID FLOW AND METHODS FOR USE IN CONNECTION WITH SUCH A VALVE

(71) Applicant: IMI HYDRONIC ENGINEERING INTERNATIONAL SA, Eysins (CH)

(72) Inventor: Daniel Jilderos, Brämhult (SE)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 300 days.

(21) Appl. No.: 17/781,166

(22) PCT Filed: Nov. 24, 2020

(86) PCT No.: PCT/EP2020/083229
§ 371 (c)(1),
(2) Date: May 31, 2022

(87) PCT Pub. No.: WO2021/110485
PCT Pub. Date: Jun. 10, 2021

(65) Prior Publication Data
US 2023/0003318 A1    Jan. 5, 2023

(30) Foreign Application Priority Data
Dec. 2, 2019 (EP) .................................... 19212860

(51) Int. Cl.
*F16K 37/00* (2006.01)
(52) U.S. Cl.
CPC ...... *F16K 37/0091* (2013.01); *F16K 37/0083* (2013.01)
(58) Field of Classification Search
CPC .... G01F 11/12; F16K 37/0091; F16K 5/0407; F16K 5/0207; F16K 1/526; G01L 13/06;
(Continued)

(56) References Cited

U.S. PATENT DOCUMENTS 2,064,795 A * 12/1936 Gerdts .................... F22B 37/48
116/222
3,696,659 A * 10/1972 Lawford ............... G01L 27/005
73/1.69

(Continued)

FOREIGN PATENT DOCUMENTS

AU    2017245592 A1 * 10/2018 .......... G01L 13/025
EP    3229002 A1 * 10/2017
(Continued)

OTHER PUBLICATIONS

European Search Report dated Jun. 18, 2020, issued by the European Patent Office in corresponding European Application No. 19212860.1. (8 pages).

(Continued)

*Primary Examiner* — Tran M. Tran
(74) *Attorney, Agent, or Firm* — Buchanan Ingersoll & Rooney PC (57) ABSTRACT

A valve for adjusting a fluid flow. The valve includes a valve body, a flow having an inlet and an outlet located downstream of the inlet, a flow adjustment arrangement for adjusting the flow of liquid from the inlet to the outlet, wherein liquid upstream of the flow adjustment arrangement but downstream of the inlet has an upstream pressure, and liquid downstream of said flow adjustment arrangement but upstream of the outlet has a downstream pressure, a stationary differential pressure sensor configured to measure a pressure difference between the upstream pressure and the downstream pressure, and a pair of pressure ports for enabling temporary connection of a non-stationary differential pressure sensor for measuring the pressure difference between the upstream pressure and the downstream pressure. Also a method for use with such a valve.

17 Claims, 5 Drawing Sheets

(58) Field of Classification Search
CPC .. G01L 27/005; G05D 7/0113; F24D 19/1036
See application file for complete search history.

(56) References Cited

U.S. PATENT DOCUMENTS

| | | | | |
|---|---|---|---|---|
| 4,016,760 | A * | 4/1977 | Taylor | G01F 1/38 |
| | | | | 73/861.47 |
| 4,817,022 | A * | 3/1989 | Jornod | G01D 3/022 |
| | | | | 73/765 |
| 5,197,328 | A * | 3/1993 | Fitzgerald | F16K 37/0091 |
| | | | | 702/183 |
| 5,291,920 | A * | 3/1994 | Glansk | F24D 19/1036 |
| | | | | 251/145 |
| 5,566,711 | A * | 10/1996 | Glansk | F24D 19/0002 |
| | | | | 137/557 |
| 5,806,565 | A * | 9/1998 | Kadlicko | F15B 13/0438 |
| | | | | 137/625.63 |
| 5,895,841 | A * | 4/1999 | Lowell | G01N 15/0893 |
| | | | | 73/865.5 |
| 6,349,735 | B2 | 2/2002 | Gul | G01L 19/0015 |
| | | | | 137/557 |
| 6,729,343 | B2 * | 5/2004 | Ludwig | G05D 7/0635 |
| | | | | 137/486 |
| 7,055,547 | B2 * | 6/2006 | Wang | F16K 37/0066 |
| | | | | 137/557 |
| 7,309,113 | B2 * | 12/2007 | Carter | F17C 13/04 |
| | | | | 303/1 |
| 7,735,514 | B2 * | 6/2010 | Marstorp | G05D 7/0126 |
| | | | | 137/637.4 |
| 7,765,879 | B2 * | 8/2010 | Ohtani | G01F 1/40 |
| | | | | 251/304 |
| 8,152,134 | B2 * | 4/2012 | Stenberg | F16K 1/526 |
| | | | | 137/614.19 |
| 8,424,556 | B2 * | 4/2013 | Norlander | F24D 19/1015 |
| | | | | 137/557 |
| 8,528,430 | B2 * | 9/2013 | Jilderos | F16L 37/42 |
| | | | | 73/866.5 |
| 8,596,296 | B2 * | 12/2013 | Rasmussen | F24D 19/1015 |
| | | | | 137/315.04 |
| 8,602,053 | B2 * | 12/2013 | Jjilderos | G01L 27/002 |
| | | | | 73/1.72 |
| 8,602,054 | B2 * | 12/2013 | Jilderos | F16K 17/02 |
| | | | | 73/1.72 |
| 8,833,177 | B2 * | 9/2014 | McDaniel | G01F 1/46 |
| | | | | 73/861.65 |
| 8,857,791 | B2 * | 10/2014 | Rogalka | F16K 1/10 |
| | | | | 251/266 |
| 8,863,770 | B2 * | 10/2014 | Markvart | F24D 19/1036 |
| | | | | 137/557 |
| 8,985,140 | B2 * | 3/2015 | Pettinaroli | G05D 7/0106 |
| | | | | 137/487 |
| 9,273,787 | B2 * | 3/2016 | Ibsen | F16K 5/0407 |
| 9,285,059 | B2 * | 3/2016 | Ibsen | G05D 16/028 |
| 9,910,447 | B2 * | 3/2018 | Pettinaroli | F16K 1/42 |
| 10,247,590 | B2 * | 4/2019 | Cucciniello | F16K 15/026 |
| 10,458,563 | B2 * | 10/2019 | Holmgren | F24D 19/1015 |
| 10,619,757 | B2 * | 4/2020 | Thybo | F16K 31/1245 |
| 11,156,523 | B2 * | 10/2021 | Jilderos | G01L 19/04 |
| 11,746,917 | B2 * | 9/2023 | Muzzo | F16K 17/048 |
| | | | | 137/68.19 |
| 2003/0046974 | A1 * | 3/2003 | Kosh | G01L 27/005 |
| | | | | 73/1.57 |
| 2010/0077829 | A1 * | 4/2010 | Batista | G01L 27/005 |
| | | | | 73/1.57 |
| 2011/0240148 | A1 * | 10/2011 | Norlander | F24D 19/1015 |
| | | | | 137/535 |
| 2013/0098475 | A1 * | 4/2013 | Jilderos | F16K 1/32 |
| | | | | 137/237 |
| 2017/0068254 | A1 * | 3/2017 | Hero | G05D 7/0635 |
| 2019/0072452 | A1 * | 3/2019 | Johnson | F16K 37/0066 |
| 2020/0232579 | A1 | 7/2020 | Jilderos | |

FOREIGN PATENT DOCUMENTS

| | | | | |
|---|---|---|---|---|
| EP | 3229003 A1 * | 10/2017 | | G01L 13/025 |
| EP | 3467389 A1 | 4/2019 | | |
| GB | 2410332 A | 7/2005 | | |
| JP | 2012163499 A | 8/2012 | | |
| WO | 2010090572 A1 | 8/2010 | | |
| WO | 2012009062 A1 | 1/2012 | | |
| WO | WO-2017174547 A2 * | 10/2017 | | G01L 13/025 |

OTHER PUBLICATIONS

International Search Report (PCT/ISA/210) and Written Opinion (PCT/ISA/237) mailed on Feb. 8, 2021, by the European Patent Office as the International Searching Authority for International Application No. PCT/EP2020/083229. (10 pages).

* cited by examiner

VALVE FOR ADJUSTING A FLUID FLOW AND METHODS FOR USE IN CONNECTION WITH SUCH A VALVE

TECHNICAL FIELD

The present invention relates to a valve or adjusting a fluid flow. The invention also relates to methods for use in connection with such a valve.

BACKGROUND ART

Fluid distribution systems, for e.g. heating, cooling and water supply are designed to feed a fluid from a source to a consumption point. Each consumption point typically has a calculated and designed flow or differential pressure requirement. However, depending on the type of hydronic system, the flow requirement is often variable over time and can change with factors like seasonality (e.g. summer or winter), that changes the load from the consumption points, temperature changes of the system fluid, changes in consumption of the system fluid (e.g. for drinking water).

Control valves, balancing valves, and combined control and balancing valves are frequently used in fluid distribution systems and have a variable opening such that the flow rates can be controlled. Hereby, the flow fed to the consumption point may be varied in an effective manner.

A valve typically controls the flow by a flow adjustment arrangement, the flow adjustment arrangement comprising an adjustment member, such as a valve plug, and a mating or receiving portion, such as a valve seat arranged to mate with or receive the adjustment member. In other examples, the valve may be a ball valve in which the adjustment member is shaped as a ball which is arranged to rotated and shift its position relative to the receiving portion, and thereby change the opening degree of the flow adjustment arrangement.

A fluid flow through the valve, and the flow adjustment arrangement, will be subject to a pressure drop. Thus, the fluid upstream of the flow adjustment arrangement will be at an upstream pressure, and fluid downstream of the flow adjustment arrangement will be at a downstream pressure. Such pressure drop is typically of interest for controlling the flow, and in the long run the energy consumption of the fluid distribution system in which the valve is arranged. Thus, valves may be equipped with measuring nipples providing fluid paths to fluid at an upstream pressure and downstream pressure respectively. An operator may insert measuring devices into the measuring nipple, the measuring devices being connected to a portable differential pressure sensor, thereby allowing the operator to measure the pressure drop using the portable differential pressure sensor. However, this may be perceived as a cumbersome procedure requiring an operator to perform several manual steps. Recent development has presented an alternative which reduces or eliminates this manual handling of an operator and which completely eliminates the measuring nipples. Instead of an operator needing to access the flow by inserting measuring devices into measuring nipples, a differential pressure sensor may be installed already during manufacturing. Thus, the differential pressure sensor is an integrated part of the wall body, eliminating the need for an operator to manually access the fluid flow. However, although such an integrated differential pressure sensor provides an advantage over the manual portable sensor technology, it too has some drawbacks. The accuracy of pressure sensors may vary due to different factors, for example long term use.

Thus, there is still a need in the industry to improve differential pressure measurements for a valve.

SUMMARY OF THE INVENTION

An object of the present invention is to alleviate the above-mentioned drawbacks of the existing valves. This and other objects, which will become apparent in the following, are accomplished by a valve and a method as defined in the accompanying claims.

The present inventive concept is based on the insight that although a stationary differential pressure sensor may be provided to avoid the need for use of portable pressure sensors, the additional provision of manual access allows for the possibility to check if measurements provided by the stationary differential pressure sensor are accurate and/or to determine if the stationary differential pressure sensor should be calibrated/recalibrated. Thus, the inventor has realized that the combination of a stationary differential pressure sensor and a non-stationary differential pressure sensor allows for a trustworthy long term usage of a stationary differential pressure sensor, with only occasional (less frequently than traditional valves with measuring nipples) manual check-ups using a separate non-stationary differential pressure sensor.

According to a first aspect of the invention, there is provided a valve for adjusting a fluid flow. The valve comprises:
- a valve body,
- a flow path extending through the valve body, the flow path having an inlet and an outlet located downstream of the inlet, wherein the flow path is configured to guide a flowing liquid from the inlet to the outlet,
- a flow adjustment arrangement located in the valve body between the inlet and the outlet, for adjusting the flow of liquid from the inlet to the outlet,
- wherein liquid upstream of said flow adjustment arrangement but downstream of said inlet has an upstream pressure, and liquid downstream of said flow adjustment arrangement but upstream of said outlet has a downstream pressure,
- a stationary differential pressure sensor configured to measure a pressure difference between said upstream pressure and said downstream pressure, and
- a pair of pressure ports for enabling temporary connection of a non-stationary differential pressure sensor for measuring the pressure difference between said upstream pressure and said downstream pressure.

Thus, by having a stationary differential pressure sensor, a time efficient and effective measurements may be made without requiring any frequent manual measurements. A further advantage is that a stationary differential pressure sensor may allow for continuous measurement over time. However, by also providing a pair of pressure ports enabling connection of a non-stationary differential pressure sensor, a manual check may be made at rare occasions. For instance, at certain service intervals an operator may connect a portable differential pressure sensor and compare the measurement results acquired by such a sensor with the measurement results acquired by the stationary differential pressure sensor. If the results are considered to differ too much, then the operator may decide that the stationary differential pressure sensor should be recalibrated. For instance, a recalibration of the stationary differential pressure sensor may be made by changing the flow adjustment arrangement in such a way that the differential pressure changes. As the differential pressure changes, the stationary differential pressure sensor will be corrected to indicate the same result as the non-stationary differential pressure sensor. Suitably, comparisons between the two sensors may be made over a wider operating range, such as at different opening magnitudes of the flow adjustment arrangement. For instance, comparisons may be made when the flow adjustment arrangement is fully closed, fully opened and at one or more opening magnitudes in between fully closed and fully opened.

It should be understood that the measurements of the pressure difference between the upstream pressure and the downstream pressure, may also be expressed as measurements of the differential pressure over the flow adjustment arrangement.

Furthermore, it should be understood that although the pair of pressure ports provide access for an operator to measure the difference between the upstream pressure and the downstream pressure, the access points where the upstream pressure and the downstream pressure, respectively, are taken, do not need to be the same access points as the ones from which the stationary differential pressure sensor obtains its upstream pressure and downstream pressure. However, for increased accuracy of the comparisons of the measurement results, it may be desirable to lead liquid from the same point upstream of the flow adjustment arrangement to both the stationary differential pressure sensor and a temporarily connected non-stationary differential pressure sensor. Similarly, it may be desirable to lead liquid from the same point downstream of the flow adjustment arrangement to both the stationary differential pressure sensor and a temporarily connected non-stationary differential pressure sensor.

The area of the flow path between the inlet and the flow adjustment arrangement may be referred to as the upstream side of the flow path, while the area of the flow path between the flow adjustment arrangement and the outlet may be referred to as the downstream side of the flow path.

The flow adjustment arrangement may comprise an adjustment member configured to be movable in linear or translational motion. In other exemplary embodiments, the adjustment member may be movable in a rotational motion. In either case, flow adjustment arrangement may comprise a receiving or mating part for enabling receiving or mating with the adjustment member. In case of a linear or translational motion, the adjustment member may suitably be a valve plug attached to or integral with a valve stem, wherein the valve plug may be movable in an axial direction of the valve stem. Suitably, the receiving or mating part is a valve seat. The valve plug may be moved to mate with the valve seat so as to arrive at a closed position of the flow adjustment arrangement, whereby no flow or only a leakage flow passes through the flow adjustment arrangement. The valve plug may suitably be lifted from the valve seat to various opening amounts, so as to enable adjustment of the flow through the valve. The valve may, for instance, be a control valve for continuous regulation of the flow, or a balancing valve allowing the setting of a lift limitation of the valve plug, or a combination of balancing and control valve. This different options are possible irrespective of if the flow adjustment arrangement comprises a linearly movable adjustment member or a rotatingly movable adjustment member. Thus, for a rotatingly movable adjustment member (a ball valve), the angle of rotation of the adjustment member (e.g. in the form of a ball) may be limited for balancing purposes and/or a continuous regulation of the angle relative to an opening in a seat may be made for control purposes.

The adjustment member may suitably be located downstream of the receiving or mating part. For instance, in the case of the adjustment member comprising a valve plug, then the valve plug and any attached valve stem may suitably be located downstream of the valve seat.

According to at least one exemplary embodiment, said stationary differential pressure sensor has a first pressure sensing area in fluid communication with the first measuring channel, and a second pressure sensing area in fluid communication with the second measuring channel, wherein the first pressure sensing area senses said upstream pressure and the second sensing area senses said downstream pressure. By having two distinct sensing areas, liquid communication from the upstream and downstream side of the flow adjustment arrangement may simply be provided to the respective sensing area.

The first sensing area and the second sensing area may suitably be located on opposite sides of the sensor, however other locations, such as on the same side, may also be conceivable.

The stationary differential pressure sensor may suitably comprise a board, such as a printed circuit board, on which the sensing areas are provided. Signals from the sensing areas may suitably be communicated via connections on the board to a local control unit on the board for calculating the differential pressure. Alternatively, the signals may be communicated wired or wirelessly via a communication module to a separate control unit, such as a hand held control unit or a central control unit, which calculates the differential pressure. The board may suitably be moulded or mounted into a casing, such as a plastic casing. The board may be provided with connectors, for connecting hand held control units or wireless communication module. From the above, it should be understood that logic components for calculating the results of the measured pressure difference may either be provided locally at the stationary sensor or remotely. Likewise, the result may be presented, for example on a display, locally at the valve (such as via wired communication with the stationary sensor), or via an operatively connectable display (which may be connected physically by connectors or wirelessly).

Thus, according to at least some exemplary embodiments, the valve comprises is a wireless communication module operatively connected or connectable to the stationary differential pressure sensor for wirelessly transmitting signals representative of the measurements performed by the stationary differential pressure sensor.

The wireless communication module may be configured to establish an operational connection with a handheld device such as e.g. a laptop, a smart phone, a tablet, a PDA, etc. The wireless operational connection may be e.g. Bluetooth, ZigBee, or any other wireless RF technology.

According to at least one exemplary embodiment, the stationary differential pressure sensor may comprise a temperature sensing component. Such a temperature sensing component may suitably be provided on the above-exemplified board, however other arrangements are conceivable. A temperature sensing component may be used for temperature compensation of the differential pressure measurements and/or for providing data to a user for knowing the temperature of the liquid.

According to at least one exemplary embodiment, the pair of pressure ports comprises:
    a first pressure port for accessing a first measuring channel of the valve, the first measuring channel being in fluid communication with the flow path upstream of said flow adjustment arrangement but downstream of said inlet, and a second pressure port for accessing a second measuring channel of the valve, the second measuring channel being in fluid communication with the flow path downstream of said flow adjustment arrangement but upstream of said outlet.

By providing measuring channel a longer access area for a measuring device may be provided than just a direct opening into the flow path. Each measuring channel may suitably be provided with one or more seals which may be penetrated by a measuring device (such as a measuring needle) which may be inserted through the respective pressure port.

According to at least one exemplary embodiment, the valve comprises a first measuring nipple and a second measuring nipple, wherein said first pressure port and said first measuring channel are provided in said first measuring nipple, wherein said second pressure port and said second measuring channel are provided in said second measuring nipple. Measuring nipple is advantageous in that it provides for a robust access point for measuring devices. The measuring nipples may suitably be formed in one piece with the valve body, or formed in two separate processes and then fixed to the valve body, such as by welding. The first and the second measuring nipples are suitably provided on the same side of the valve body. In at least some exemplary embodiments the first and the second measuring nipples are both provided on one side of the flow adjustment arrangement. In such case, one of the measuring nipples may suitably be in communication with a fluid conduit which leads past or around the flow adjustment arrangement. For instance, if the measuring nipples are provided at the upstream side of the flow adjustment arrangement, then the second measuring nipple may suitably be fluidly connected or connectable to a conduit which leads to the downstream side of the flow path. In other exemplary embodiments the first measuring nipple may be provided at the upstream side, while the second measuring nipple is provided at the downstream side, in which case conduits that bypass the flow adjustment arrangement are not needed.

According to at least one exemplary embodiment, the first measuring nipple has a first opening enabling liquid upstream of the flow adjustment arrangement to enter the first measuring channel and a second opening enabling the entered liquid to exit the first measuring nipple and come into contact with the first pressure sensing area. This is advantageous since the liquid that is guided from the upstream side to the first measuring channel is also guided to the first pressure sensing area of the stationary differential pressure sensor. Thus, liquid that has been bled from the upstream side of the flow path will exert the same pressure in the measuring channel as at the first pressure sensing area. Thus, since the liquid to the measuring channel and to the first sensing area is bled from the same access point at the upstream side of the flow path the pressure exerted on the first pressure sensing area of the stationary differential pressure sensor should be substantially the same as the pressure that would be detected by a measuring device inserted into the measuring channel. This enables a reliable check of the accuracy of the stationary differential pressure sensor, or at least the first pressure sensing area thereof. Similarly, a corresponding provision may be made for the second measuring nipple and the second pressure sensor area, which is reflected in the following exemplary embodiment.

Thus, according to at least one exemplary embodiment, the second measuring nipple has a first opening enabling liquid downstream of the flow adjustment arrangement to enter the second measuring channel and a second opening enabling the entered liquid to exit the second measuring nipple and come into contact with the second pressure sensing area.

According to at least one exemplary embodiment, the stationary differential pressure sensor is interposed between the first and the second measuring nipple. By providing the stationary differential pressure sensor at such a location, only a short fluid connection is needed from the first measuring nipple to the first pressure sensing area, and from the second measuring nipple and to the second pressure sensing area. Thus, a first interconnecting conduit may be provided between the first measuring nipple and the first pressure sensing area of the stationary differential pressure sensor. A second interconnecting conduit may be provided between the second measuring nipple and the second pressure sensing area of the stationary differential pressure sensor. Such interconnecting conduits may, in at least some exemplary embodiments, extend through the valve body. In other exemplary embodiments, the interconnecting conduits may extend outside of the valve body.

According to at least one exemplary embodiment, at least a portion of each one of the first and second measuring nipples project away from the valve body, wherein the stationary differential pressure sensor is fixed in the valve body. Suitably, interconnecting conduits may extend through the valve body from the first and second pressure sensing areas of the stationary differential pressure sensor to the first and the second measuring nipples, respectively.

According to at least one exemplary embodiment, at least a portion of each one of the first and second measuring nipples project away from the valve body, wherein the stationary differential pressure sensor is fixed to the projecting portions of the first and second measuring nipples. Suitably, interconnecting conduits may extend outside of the valve body from the first and second pressure sensing areas of the stationary differential pressure sensor to the first and the second measuring nipples, respectively.

According to at least one exemplary embodiment, the stationary differential pressure sensor is integrated into said valve body. For, instance it may be arranged in a wall arranged in said valve body. Such a wall may have a cavity holding said stationary differential pressure sensor. A first aperture in the wall may provide a pressurized communication between the stationary differential pressure sensor and liquid at said upstream pressure, and a second aperture in the wall may provide a pressurized communication between the stationary differential pressure sensor and liquid at said downstream pressure.

In some exemplary embodiments, said wall may be a partition wall separating liquid at said upstream pressure from the liquid at said downstream pressure.

For example, the wall which together with the flow adjustment arrangement in a closed state (for example in the form of a valve plug sealing against a valve seat) fluidly separate said inlet from said outlet, may be referred to as a partition wall. However, a partition wall may in other exemplary embodiments be arranged elsewhere in the valve body where it separates fluid at the upstream and downstream pressure.

By having the stationary differential pressure sensor held in a cavity of said partition wall, the stationary differential pressure sensor can be placed physically close to the liquid both at the upstream side and the downstream side of the flow path, without requiring long conduits.

The pressure difference between liquid at said upstream pressure and liquid at said downstream pressure may mainly corresponds to a liquid pressure drop over said flow adjustment arrangement. Thus, the upstream pressure will normally be a relatively high pressure, while the downstream pressure will normally be a relatively low pressure.

According to a second aspect of the invention, there is provided a method for use in connection with the valve according to the first aspect, including any embodiment thereof. More particularly, it relates to a method for determining the measurement accuracy of the stationary differential pressure sensor, the method comprising:

measuring, by means of the stationary differential pressure sensor, the differential pressure over said flow adjustment arrangement, inserting through said pair of pressure ports measuring devices connected to a non-stationary differential pressure sensor, measuring, by means of the non-stationary differential pressure sensor, the differential pressure over said flow adjustment arrangement in order to determine the accuracy of the measurement provided by the stationary differential pressure sensor.

According to at least one exemplary embodiment, said insertion step comprises:

inserting through the first pressure port a first measuring device into the first measuring channel and through the second pressure port a second measuring device into the second measuring channel, the first and second measuring devices being connected to a non-stationary differential pressure sensor.

According to a third aspect of the invention, there is provided a method for use in connection with the valve according to the first aspect, including any embodiment thereof. More particularly, it relates to a method for calibrating the stationary differential pressure sensor, the method comprising:

measuring, by means of the stationary differential pressure sensor, the differential pressure over said flow adjustment arrangement, inserting through said pair of pressure ports measuring devices connected to a non-stationary differential pressure sensor, measuring, by means of the non-stationary differential pressure sensor, the differential pressure over said flow adjustment arrangement, comparing the measurements of the stationary differential pressure sensor and the non-stationary differential pressure sensor, calibrating the stationary differential pressure sensor based on the comparison.

According to at least one exemplary embodiment, the step of inserting comprises:

inserting through said first pressure port a first measuring device into the first measuring channel and through said second pressure port a second measuring device into the second measuring channel, the first and second measuring devices being connected to a non-stationary differential pressure sensor.

The methods of the second and third aspects allows for an operator to check and/or adjust the stationary differential pressure sensor, by temporarily connecting a non-stationary differential pressure sensor.

The measuring devices may suitably be in the form of removable measuring needles.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
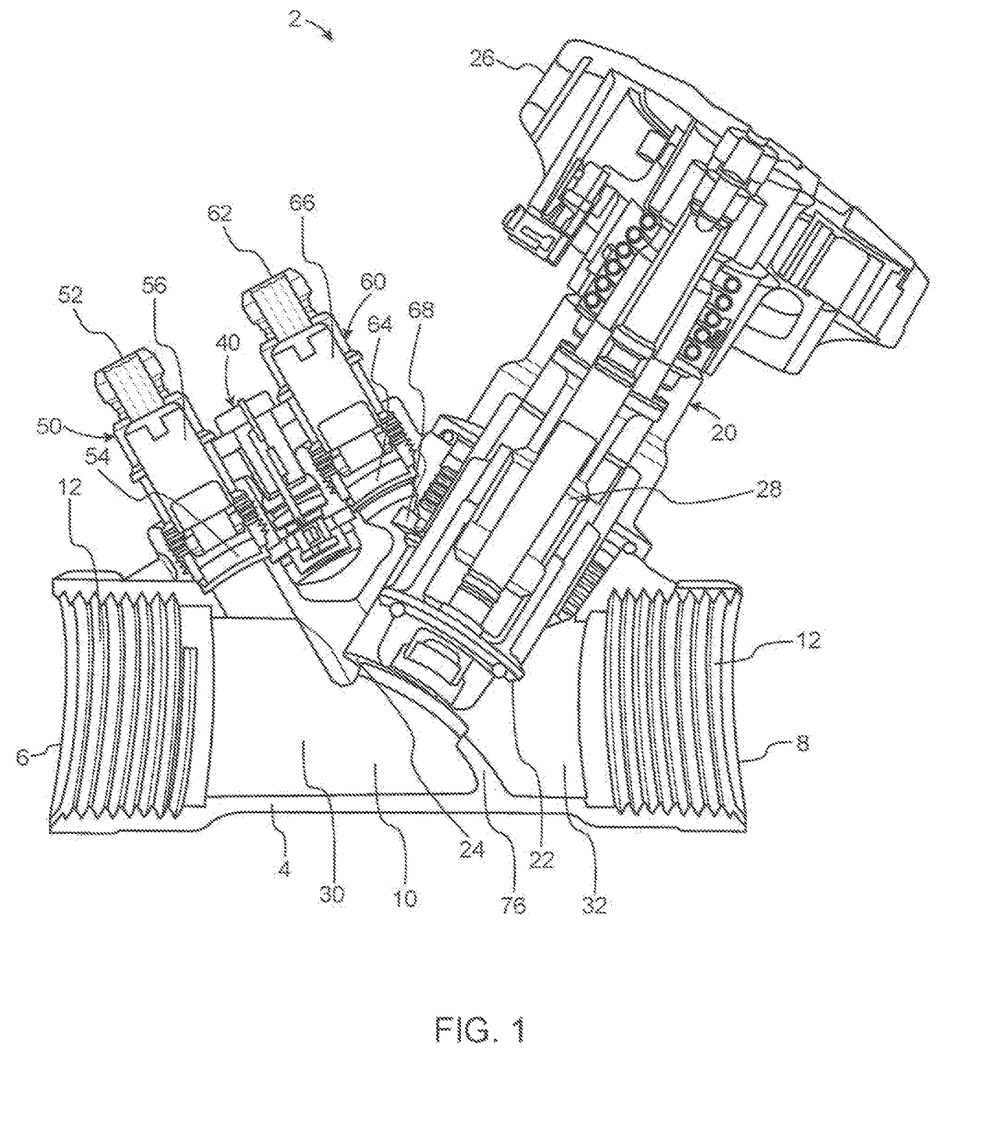
FIG. 1 is a cross-sectional view of a valve according to at least a first exemplary embodiment of the invention.

FIG. 1 is a cross-sectional view of a valve 2 according to at least a first exemplary embodiment of the invention.

The valve 2 is configured to adjust a liquid flow through the valve 2. The valve 2 comprises a valve body 4. A flow path 10 extends through the valve body 4, from an inlet 6 to and outlet 8. The inlet 6 and the outlet 8 is shared by the valve 2 and the flow path 10. The outlet 8 is located downstream of the inlet 6, wherein the flow path 10 is configured to guide a flowing liquid from the inlet 6 to the outlet 8.

At the inlet 6 and the outlet 8, the valve body 4 is provided with internal threads 12 to which external threads of pipe sections of a fluid distribution system may be threaded. The valve 2 may suitably be used in a fluid distribution system such as in a building having a plurality of consumption points. The valve 2 may be a balancing valve for setting an appropriate flow at one of said consumption points. The flow may be adjusted by setting a flow adjustment arrangement 20 in a desired state. In this exemplary embodiment, the flow adjustment arrangement 20 comprises an adjustment member in the form of a valve plug 22 and a receiving part in the form of a valve seat 24. The flow adjustment arrangement 20 may be moved from a closed position, in which no flow or only a leakage flow passes through the flow adjustment arrangement 20, to a fully opened position, or to any intermediate position between closed and fully opened. In the closed position, the valve plug 22 seals against the valve seat 24. The valve plug 22 may be moved turning a handwheel 26 of the flow adjustment arrangement 20, the rotation of which will be transferred into an axial movement of a valve stem 28 attached to the valve plug 22. Thus, by rotating the handwheel 26 in one direction the valve plug 22 may be lifted away from the valve seat 24, and rotating the handwheel 26 in the other direction will cause the valve plug 22 to move towards the valve seat 24. In other exemplary embodiments, the handwheel 26 may be replaced by or complemented by an electronic actuator connected to the valve stem 28 for setting the position of the valve plug 22.

The flow adjustment arrangement 20 is located in the valve body 4 between the inlet 6 and the outlet 8, and will thus adjust the flow of liquid from the inlet 6 to the outlet 8. Since the flow adjustment arrangement 20 presents or may present a restriction, i.e. a reduced flow-through area for the liquid, when the liquid passes through the flow adjustment arrangement 20 it will be subjected to a pressure drop. In other words, liquid upstream of the flow adjustment arrangement 20 but downstream of the inlet 6 has an upstream pressure, which may be a relatively high pressure. This volume may also be referred to the upstream side 30 of the flow path 10. Liquid downstream of the flow adjustment arrangement 20 but upstream of the outlet 8 has a downstream pressure, which may be a relatively low pressure. This volume may also be referred to as the downstream side of the flow path 10.

The valve 2 comprises a stationary differential pressure sensor 40 configured to measure a pressure difference between the upstream pressure and the downstream pressure, i.e. between the pressure on the upstream side 30 and the downstream side 32. The differential pressure across the valve adjustment arrangement 20 can be used for calculating the flow velocity through it, and thus the mass and volume flow along the flow path 10. Therefore, the stationary differential pressure sensor 40 may be used to check the present flow through the valve 2. Accordingly when setting an opening state of the flow adjustment arrangement 20, in this case when setting the separating distance between the valve plug 22 and the valve seat 24 to obtain a desired flow through the valve 2, the measurements performed by the stationary differential pressure sensor 40 may suitably be taken into account to confirm when a desired flow has been reached. The stationary differential pressure sensor 40 may suitably communicate its information via wired or wireless communication to remote modules, cell phones, central control units, building management system, etc. or via connectors to connectable devices such as hand-held devices having displays and any appropriate processing circuitry for processing, storing, and/or forwarding, etc. the information received from the stationary differential pressure sensor 40. The stationary differential pressure sensor 40 itself may be provided with a display for a direct reading of the flow and/or differential pressure. In exemplary embodiments, the differential pressure sensor 40 may comprise a temperature sensing component for measuring the temperature of the liquid. Such temperature measurements may be communicated or displayed similarly as described above with respect to the pressure measurements.

It should be understood that the stationary differential pressure 40 forms part of the complete valve 2 as such. Thus, under normal conditions and normal use, it is not configured to be removable, but to remain in place as part of the valve installation.

Therefore, the stationary differential pressure sensor 40 is intended to be used almost every time a differential pressure measurement is to be taken, for example when checking the present flow through the valve 2 or when resetting the flow adjustment arrangement 20 to achieve a different desired flow through the valve 2.

However, at rare occasions it may be desirable to check if the stationary differential pressure sensor 40 is still accurate, or is in need of recalibration. Therefore, the valve 2 is also provided with a pair of pressure ports 52, 62 for enabling temporary connection of a non-stationary differential pressure sensor (not shown) for measuring the pressure difference between said upstream pressure and said downstream pressure.

The pressure ports 52, 62 are here illustrated as entrances to measuring nipples 50, 60 having a respective measuring channel 54, 64. The measuring nipples 50, 60 project away from the valve body 4. In other exemplary embodiment, the pressure ports may be arranged at a different structure, such as directly on the valve body 4.

The pair of pressure ports comprises a first pressure port 52 and a second pressure port 62. The first pressure port 52 is provided for accessing a first measuring channel 54 being in fluid communication with the flow path 10 upstream of the flow adjustment arrangement 20 but downstream of the inlet 6 (i.e. in fluid communication with the upstream side 30). The second pressure port 62 is provided for accessing a second measuring channel 64 in fluid communication with the flow path 10 downstream of the flow adjustment arrangement 20 but upstream of the outlet 8 (i.e. in fluid communication with the downstream side 32). The first pressure port 52 and the first measuring channel 54 are provided in a first measuring nipple 50. The second pressure port 62 and the second measuring channel 64 are provided in a second measuring nipple 60.

Suitably, there may be provided sealing members 56, 66, such as of rubber or other resilient material, which block liquid from exiting through the pressure ports 52, 62. Two measuring devices (not shown), one for each measuring nipple, may suitably be inserted through the respective pressure port 52, 54 and caused to penetrate the sealing members 56, 66 so that liquid can flow from the measuring channels 54, 64 through the temporarily inserted measuring devices to a non-stationary differential pressure sensor in fluid communication with each measuring device. The measuring devices may for instance be in the form of hollow measuring needles.

By comparing the measurement results of the non-stationary differential pressure sensor and the stationary differential pressure sensor 40, the accuracy of the stationary differential pressure sensor 40 may be checked, and/or the results may be used as a basis for calibrating the stationary differential pressure sensor 40. A corresponding procedure may be performed for an integrated temperature sensing component by checking its accuracy compared to a portable temperature measuring device temporarily inserted through one of the pressure ports, suitably the first pressure port 52 having the first measuring channel 54 debouching directly at the flow path 10.

As can be seen in FIG. 1, the first measuring channel 54 of the first measuring nipple 50 extends all the way to the flow path 10 at the upstream side 30. The second measuring nipple 60, however, is in this embodiment located on the same side of the flow adjustment arrangement 20 as the first measuring nipple 50. Therefore, the second measuring channel 64 is, via a bypass conduit 68 going past the flow adjustment arrangement 20, in fluid communication with the flow path 10 at the downstream side 32.

Figure 2:
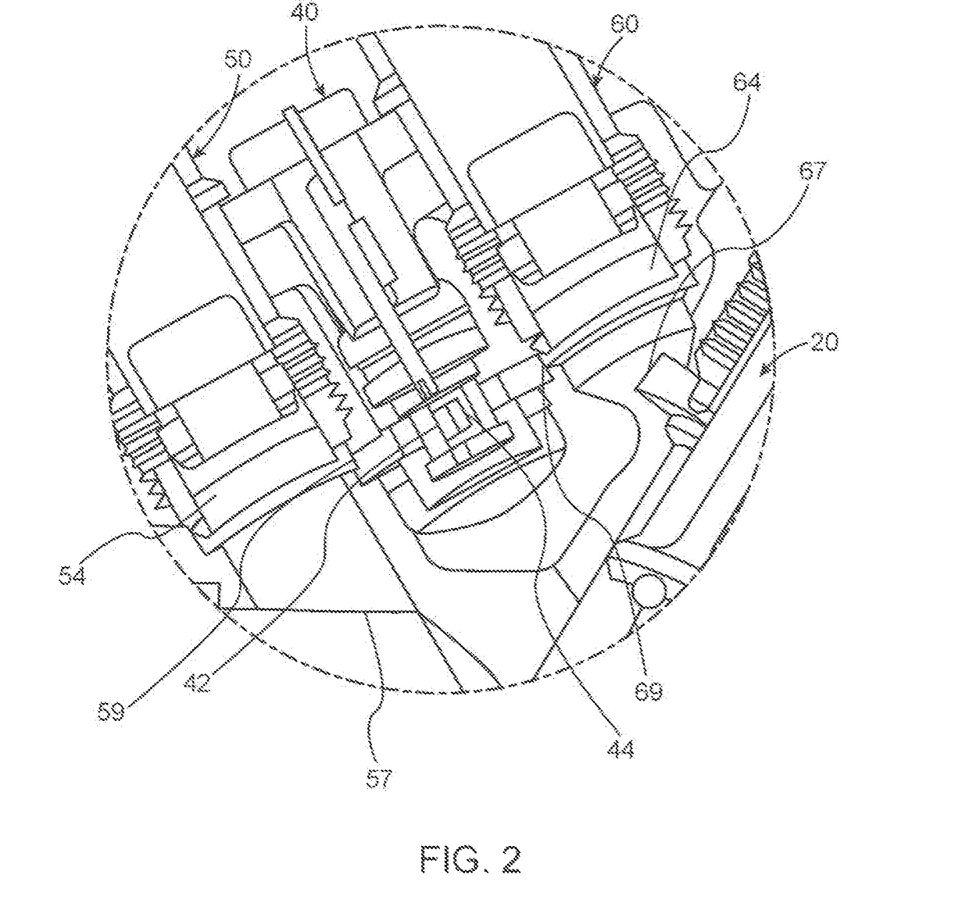
FIG. 2 is an enlarged view of a detail in FIG. 1.

As best seen in FIG. 2, the stationary differential pressure sensor 40 has a first pressure sensing area 42 in fluid communication with the first measuring channel 54, and a second pressure sensing area 44 in fluid communication with the second measuring channel 64, wherein the first pressure sensing area 42 senses said upstream pressure and the second pressure sensing area 44 senses said downstream pressure.

Thus, with reference to FIG. 2, which is an enlarged view of a detail in FIG. 1, it can be seen that the first pressure sensing area 42 and the second pressure sensing area 44 are in fluid communication with the first measuring channel 54 and the second measuring channel 64, respectively. More particularly, the first measuring nipple 50 has a first opening 57 enabling liquid upstream of the flow adjustment arrangement 20 to enter the first measuring channel 54 and a second opening 59 enabling the entered liquid to exit the first measuring nipple 50 and come into contact with the first pressure sensing area 42. Similarly, the second measuring nipple 60 has a first opening 67 enabling liquid downstream of the flow adjustment arrangement 20 to enter the second measuring channel 64 and a second opening 69 enabling the entered liquid to exit the second measuring nipple 60 and come into contact with the second pressure sensing area 44.

In the exemplary embodiment of FIG. 1 and FIG. 2, the stationary differential pressure sensor 40 is interposed between the first measuring nipple 50 and the second measuring nipple 60. This is also the case in FIG. 3, which shows a cross-sectional view of a valve 102 according to at least a second exemplary embodiment of the invention, including an enlarged view of a detail of the valve 102.

Figure 3:
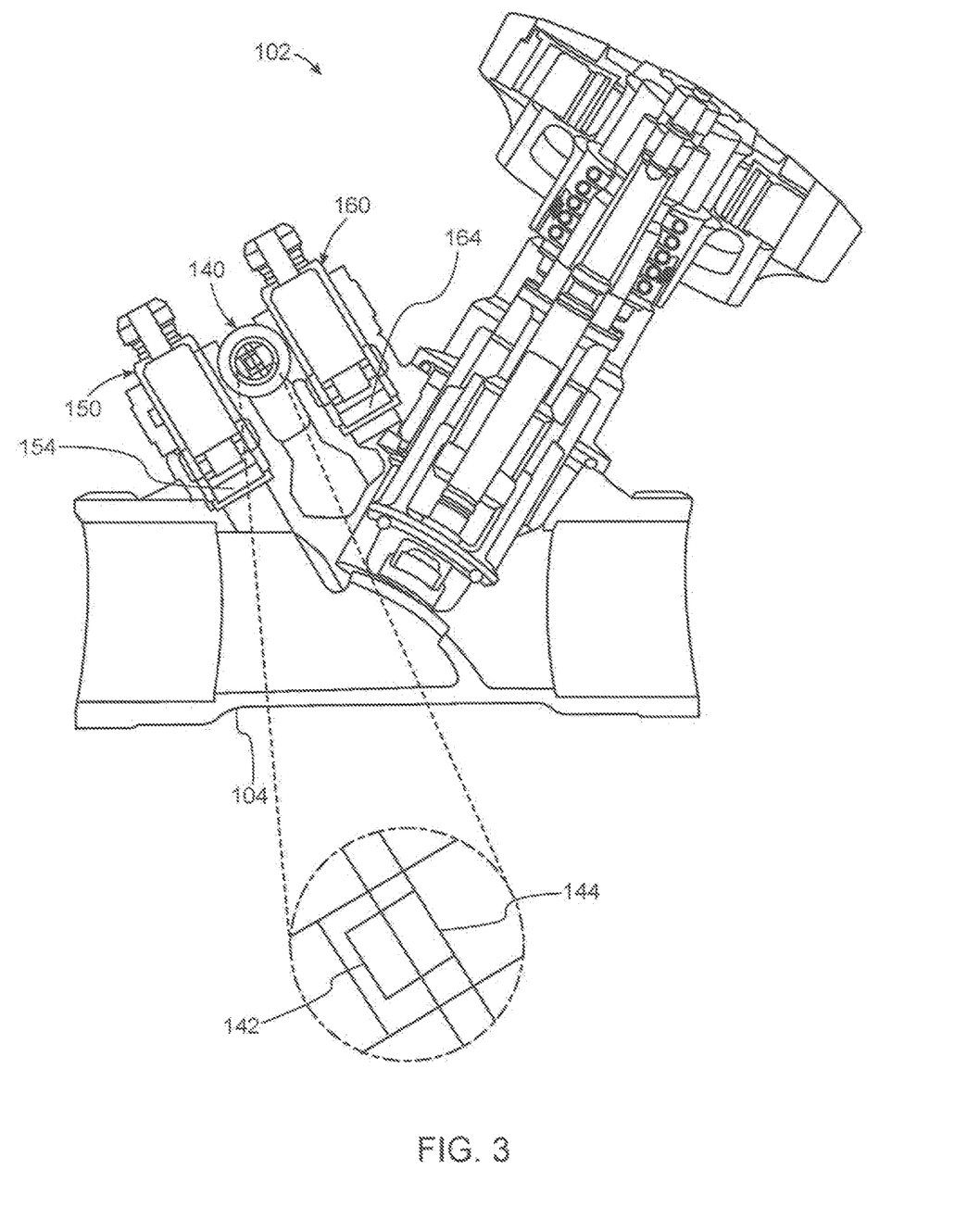
FIG. 3 is a cross-sectional view of a valve according to at least a second exemplary embodiment of the invention, including an enlarged view of a detail of the valve.

A difference between the exemplary embodiment of FIGS. 1-2 and the exemplary embodiment of FIG. 3, is that in FIGS. 1-2, the stationary differential pressure sensor 40 is fixed in/to the valve body 4, while in FIG. 3 the stationary differential pressure sensor 140 is not in contact with the valve body 104, but is fixed to the first and second measuring nipples 150, 160. Of course, in other exemplary embodiments, the stationary differential pressure sensor may be fixed to the first and second measuring nipples as in FIG. 3, but also be in contact with and/or fixed to the valve body.

As can be seen in all figures of the valve, at least a portion of each one of the first and second measuring nipples project away from the valve body. It should be understood that the measuring nipples may be formed in one piece with the valve body, or as separate pieces connected, e.g. by welding, to the valve body.

In the exemplary embodiment of FIG. 3, the stationary differential pressure sensor 140 is fixed to the projecting portions of the first and second measuring nipples 150, 160. Thus, the second openings (not shown) of the measuring nipples 150, 160 fluidly connecting the measuring channels 154, 164 with the first and second pressure sensing areas 142, 144, respectively, may suitably be located at the projecting portions.

In exemplary embodiments there may be provided interconnecting conduits which fluidly connect the first and second measuring channels with the first and second pressure sensing areas, respectively. In the exemplary embodiment having the stationary differential pressure sensor 40 fixed to the valve body 4, as for instance in FIGS. 1-2, such interconnecting conduits may extend through the valve body 4. In other exemplary embodiments having the stationary differential pressure sensor 140 fixed to the measuring nipples 150, 160, as for instance in FIG. 3, such interconnecting conduits may extend outside of the valve body 104.

By interconnecting the measuring channels with the pressure sensing areas, and placing them near each other, the pressure of the liquid will be substantially the same in the first measuring channel as at the first pressure sensing area, and substantially the same in the second measuring channel as at the second pressure sensing area. This is beneficial since it will enable an accurate calibration when carrying out the inventive method described herein.

Figure 4:
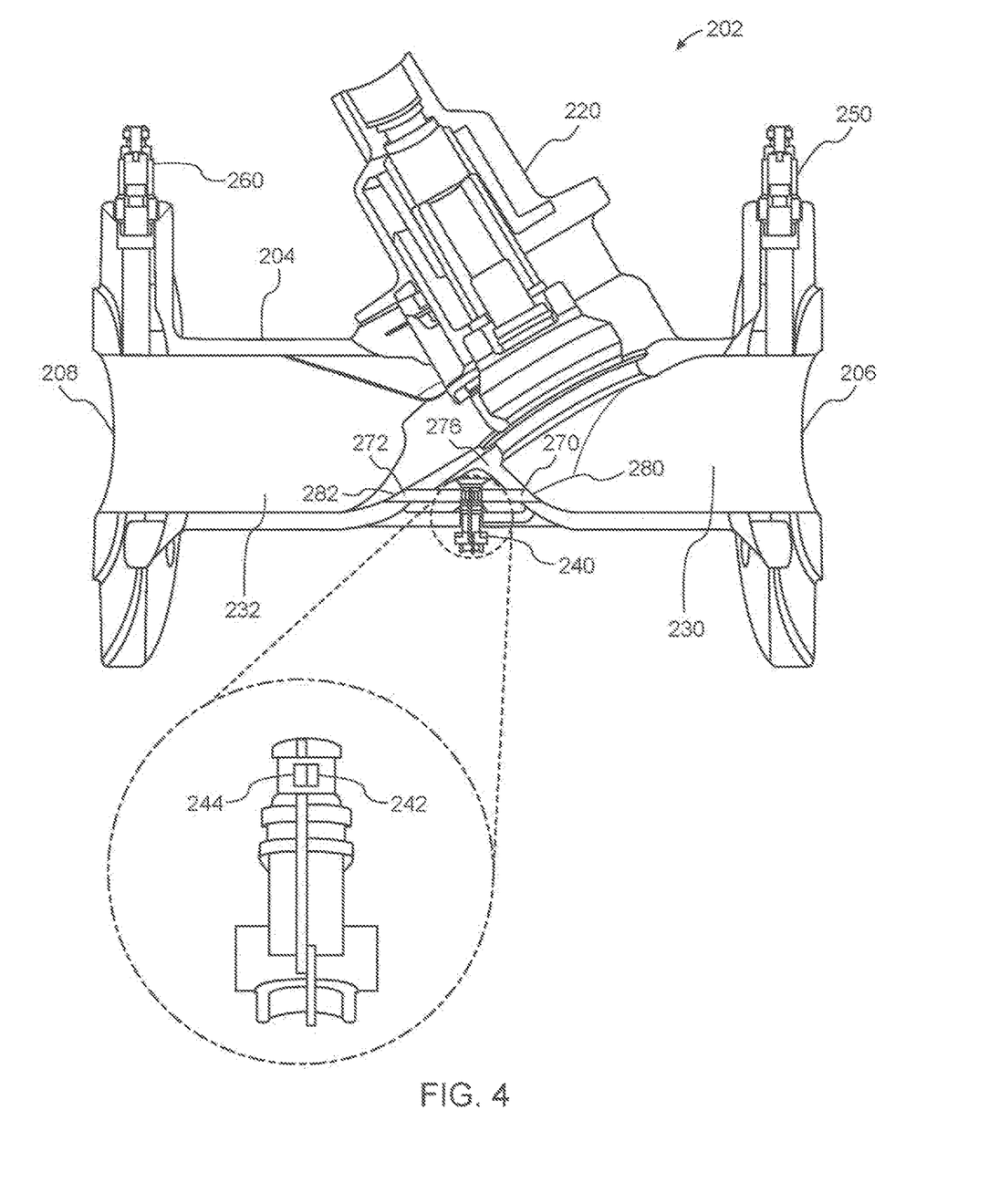
FIG. 4 is a cross-sectional view of a valve according to at least a third exemplary embodiment of the invention, including an enlarged view of a detail of the valve.

It should, however, be understood that the general inventive concept is also applicable for embodiments in which the stationary differential pressure sensor does not have an interconnecting conduit to the measuring channels and/or is placed at a larger distance therefrom. The inventive method may in such case still be used for calibrating the stationary differential pressure sensor with a satisfactory result, however, one should be aware that the error margin may be somewhat larger in such case. FIG. 4 shows such an example.

FIG. 4 is a cross-sectional view of a valve 202 according to at least a third exemplary embodiment of the invention, including an enlarged view of a detail of the valve 202. Similarly to the previously illustrated exemplary embodiment, this valve 202 has an inlet 206 and an outlet 208 and a flow adjustment arrangement 220 between the inlet 206 and the outlet 208. N.B. in FIG. 1 and FIG. 3 the inlet 6, 106 was shown at the left side of the drawing, and the outlet 8, 108 at the right side of the drawing. In FIG. 4, it is the reverse direction, i.e. the inlet 206 is at the right side of the drawing and the outlet 208 is shown at the left side of the drawing.

A first measurement nipple 250 is provided near the inlet 206, i.e. at the upstream side 230, and a second measurement nipple 260 is provided near the outlet 208, i.e. at a downstream side 232. The stationary differential pressure sensor 240 is integrated into the valve body 204. A first fluid conduit 270 extends from the upstream side 230 to the first pressure sensing area 242, and a second fluid conduit 272 extends from the downstream side 232 to the second pressure sensing area 244.

The stationary differential pressure sensor 240 is held in a cavity of a wall 276 arranged in the valve body 204. A first aperture 280 (at the end of the first fluid conduit 270) provides a pressurized communication between the stationary differential pressure sensor 240 and liquid at said upstream pressure, and a second aperture 282 (at the end of the second fluid conduit 272) provides a pressurized communication between the stationary differential pressure sensor 240 and liquid at said downstream pressure.

It should be understood that although the placement of the stationary differential pressure sensor 40, 140 in the embodiments in FIGS. 1-3, is advantageous, it would be conceivable to place it elsewhere. For instance, similar to the embodiment of FIG. 4, it would be conceivable to place the stationary differential pressure sensor in a partition wall 76 (see FIG. 1) separating the liquid at said upstream pressure from the liquid at said downstream pressure. The partition wall 76 which together with the flow adjustment arrangement 20 in a closed state (in FIG. 1 in the form of a valve plug 22 sealing against a valve seat 24) fluidly separates the inlet 6 from the outlet 8. Apertures may be provided on either side of the partition wall 76 to provide for liquid to come into contact with the respective pressure sensing area of a stationary differential pressure sensor arranged in a cavity in the partition wall 76. Inserting a temperature sensor, or inserting a stationary differential pressure sensor provided with a temperature sensing component, into such a partition wall 76 is particularly advantageous, since the placement of the partition wall 76 is beneficial for temperature measurements due to the direct access to the flowing liquid (as compared to for example FIG. 3 in which a temperature sensing component of the stationary differential pressure sensor would be distanced from the flow path 10).

Figure 5:
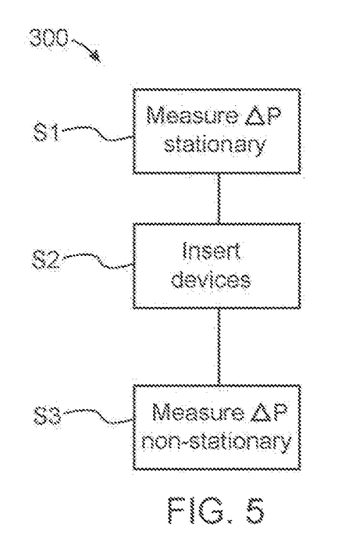
FIG. 5 is a diagram illustrating a method for use with a valve according to any exemplary embodiment of the invention.

FIG. 5 is a diagram illustrating a method 300 for use with a valve according to any exemplary embodiment of the invention. The method 300 is for determining the measurement accuracy of the stationary differential pressure sensor of the valve. The method 300 comprises:

in a step S1, measuring, by means of the stationary differential pressure sensor, the differential pressure (ΔP) over said flow adjustment arrangement, in a step S2, inserting through the pair of pressure ports measuring devices connected to a non-stationary differential pressure sensor, in a step S3, measuring, by means of the non-stationary differential pressure sensor, the differential pressure (ΔP) over said flow adjustment arrangement in order to determine the accuracy of the measurement provided by the stationary differential pressure sensor.

Figure 6:
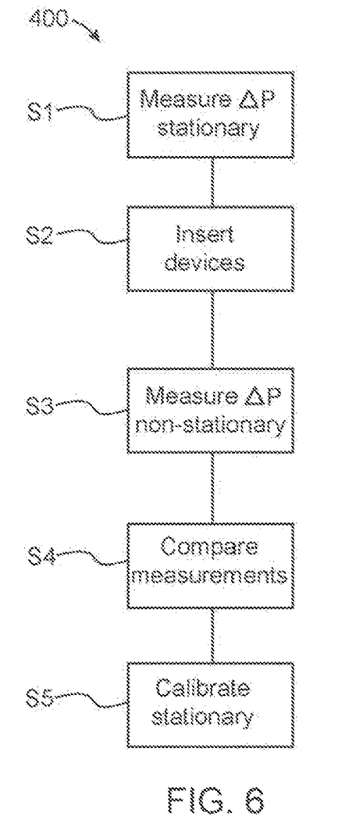
FIG. 6 is a diagram illustrating another method for use with a valve according to any exemplary embodiment of the invention.

FIG. 6 is a diagram illustrating another method 400 for use with a valve according to any exemplary embodiment of the invention. The method 400 is for calibrating the stationary differential pressure sensor of the valve. The method 400 comprises:

in as step S1, measuring, by means of the stationary differential pressure sensor, the differential pressure (ΔP) over said flow adjustment arrangement, in a step S2, inserting through said pair of pressure ports measuring devices connected to a non-stationary differential pressure sensor, in a step S3, measuring, by means of the non-stationary differential pressure sensor, the differential pressure (ΔP) over said flow adjustment arrangement, in a step S4, comparing the measurements of the stationary differential pressure sensor and the non-stationary differential pressure sensor, in a step S5, calibrating the stationary differential pressure sensor based on the comparison.

It should be understood that the listed steps of the methods 300, 400 in FIGS. 5 and 6 do not necessarily need to be performed in the listed order. For instance, step S1 may be performed simultaneously with or after step S2. In the method 400 of FIG. 6, step S1 may even be performed simultaneously with or after step S3. Furthermore, other steps may be included in exemplary embodiments.

Thus, in exemplary embodiments, the method 300 may for example comprise:

in a step S1, inserting through the pair of pressure ports measuring devices connected to a non-stationary differential pressure sensor, in a step S2, measuring, by means of the stationary differential pressure sensor, the differential pressure (ΔP) over said flow adjustment arrangement, and simultaneously by means of the non-stationary differential pressure sensor, the differential pressure (ΔP) over said flow adjustment arrangement, in a step S3, comparing the measurements from stationary and non-stationary sensor in order to determine the accuracy of the measurement provided by the stationary differential pressure sensor, and in a step S4, changing the setting of the flow adjustment arrangement to get a different differential pressure over the sensors and repeat steps S1 to S2. Step 4 may be repeated as many times as sufficient to cover the pressure range that the sensor is operating within. It is to be understood that the present invention is not limited to the embodiments described above and illustrated in the drawings; rather, the skilled person will recognize that many changes and modifications may be made within the scope of the appended claims.

The invention claimed is:

1. A valve for adjusting a fluid flow, said valve comprising:

a valve body, a flow path extending through the valve body, the flow path having an inlet and an outlet located downstream of the inlet, wherein the flow path is configured to guide a flowing liquid from the inlet to the outlet, a flow adjustment arrangement located in the valve body between the inlet and the outlet, for adjusting the flow of liquid from the inlet to the outlet, wherein liquid upstream of said flow adjustment arrangement but downstream of said inlet has an upstream pressure, and liquid downstream of said flow adjustment arrangement but upstream of said outlet has a downstream pressure, a stationary differential pressure sensor configured to measure a pressure difference between said upstream pressure and said downstream pressure, wherein said stationary differential pressure sensor has a first pressure sensing area in fluid communication with a first measuring channel of the valve, and a second pressure sensing area in fluid communication with a second measuring channel of the valve, wherein the first pressure sensing area senses said upstream pressure and the second pressure sensing area senses said downstream pressure, a pair of pressure ports configured to receive connection of a non-stationary differential pressure sensor for measuring the pressure difference between said upstream pressure and said downstream pressure, wherein the pair of pressure ports comprises:

a first pressure port for accessing the first measuring channel of the valve, the first measuring channel being in fluid communication with the flow path upstream of said flow adjustment arrangement but downstream of said inlet, and a second pressure port for accessing the second measuring channel of the valve, the second measuring channel being in fluid communication with the flow path downstream of said flow adjustment arrangement but upstream of said outlet, a first measuring nipple and a second measuring nipple, wherein said first pressure port and said first measuring channel are provided in said first measuring nipple, wherein said second pressure port and said second measuring channel are provided in said second measuring nipple, and wherein the stationary differential pressure sensor is interposed between the first measuring nipple and the second measuring nipple.

2. The valve according to claim 1, wherein the first measuring nipple has a first opening enabling liquid upstream of the flow adjustment arrangement to enter the first measuring channel and a second opening enabling the entered liquid to exit the first measuring nipple and come into contact with the first pressure sensing area.

3. The valve according to claim 1, wherein the second measuring nipple has a first opening enabling liquid downstream of the flow adjustment arrangement to enter the second measuring channel and a second opening enabling the entered liquid to exit the second measuring nipple and come into contact with the second pressure sensing area.

4. The valve according to claim 1, wherein at least a portion of each one of the first and second measuring nipples project away from the valve body, wherein the stationary differential pressure sensor is fixed in the valve body.

5. The valve according to claim 1, wherein at least a portion of each one of the first and second measuring nipples project away from the valve body, wherein the stationary differential pressure sensor is fixed to the projecting portions of the first and second measuring nipples.

6. The valve according to claim 1, wherein the stationary differential pressure sensor is integrated into said valve body.

7. The valve according to claim 6, comprising a wall arranged in said valve body, said wall having a cavity holding said stationary differential pressure sensor, a first aperture providing a pressurized communication between the stationary differential pressure sensor and liquid at said upstream pressure, and a second aperture providing a pressurized communication between the stationary differential pressure sensor and liquid at said downstream pressure.

8. The valve according to claim 1, wherein the flow adjustment arrangement comprises a valve plug and valve seat, wherein the valve plug is movable relative to the valve seat for adjusting the flow.

9. The valve according to claim 1, wherein the pressure difference between liquid at said upstream pressure and liquid at said downstream pressure mainly corresponds to a liquid pressure drop over said flow adjustment arrangement.

10. A method for use in connection with the valve according to claim 1, the method comprising:
   measuring, by means of the stationary differential pressure sensor, the differential pressure over said flow adjustment arrangement,
   inserting through the pair of pressure ports measuring devices connected to a non-stationary differential pressure sensor,
   measuring, by means of the non-stationary differential pressure sensor, the differential pressure over said flow adjustment arrangement, and
   comparing the measurements of the stationary differential pressure sensor and the non-stationary differential pressure sensor.

11. The method according to claim 10, wherein the measuring, by means of the stationary differential pressure sensor, and the measuring, by means of the non-stationary differential pressure sensor, are performed simultaneously.

12. A method for use in connection with the valve according to claim 1 for calibrating the stationary differential pressure sensor, the method comprising:
   measuring, by means of the stationary differential pressure sensor, the differential pressure over said flow adjustment arrangement,
   inserting through said pair of pressure ports measuring devices connected to a non-stationary differential pressure sensor,
   measuring, by means of the non-stationary differential pressure sensor, the differential pressure over said flow adjustment arrangement,
   comparing the measurements of the stationary differential pressure sensor and the non-stationary differential pressure sensor, and
   calibrating the stationary differential pressure sensor based on the comparison.

13. The method according to claim 12, wherein the measuring, by means of the stationary differential pressure sensor, and the measuring, by means of the non-stationary differential pressure sensor, are performed simultaneously.

14. The valve according to claim 1, wherein the stationary differential pressure sensor and the non-stationary differential pressure sensor, connected to the pair of pressure ports, are configured to simultaneously measure the pressure difference between said upstream pressure and said downstream pressure.

15. The valve according to claim 1, wherein said pair of pressure ports are arranged on a same side of the valve body of said flow adjustment arrangement and are on an upstream side of said flow adjustment arrangement.

16. The valve according to claim 1, wherein said first measuring channel of said first measuring nipple extends to the flow path upstream of said flow adjustment arrangement but downstream of said inlet and said second measuring nipple is located on a same side of the flow adjustment arrangement as said first measuring nipple.

17. The valve according to claim 16, wherein said second measuring channel via a bypass conduit is in fluid communication with the flow path downstream of said flow arrangement but upstream of said outlet.

* * * * *